(12) United States Patent
Ishii et al.

(10) Patent No.: US 7,686,590 B2
(45) Date of Patent: Mar. 30, 2010

(54) VACUUM CONTROL SYSTEM

(75) Inventors: Yoshio Ishii, Saitama-Ken (JP); Koji Tanemura, Saitama-Ken (JP); Toshihiko Matsumoto, Saitama-Ken (JP); Kozo Shirato, Saitama-Ken (JP)

(73) Assignee: ERC, Inc., Saitama (JP)

( * ) Notice: Subject to any disclaimer, the term of this patent is extended or adjusted under 35 U.S.C. 154(b) by 894 days.

(21) Appl. No.: 10/813,558

(22) Filed: Mar. 29, 2004

(65) Prior Publication Data

US 2005/0079074 A1    Apr. 14, 2005

(30) Foreign Application Priority Data

Oct. 10, 2003   (JP)   ............... 2003-352286

(51) Int. Cl.
*F04B 49/06*   (2006.01)
*G05D 7/01*    (2006.01)
*B01D 59/12*   (2006.01)

(52) U.S. Cl. .................. 417/44.2; 417/44.1; 417/413.1; 138/39; 138/40; 138/45; 138/46; 96/6

(58) Field of Classification Search ................ 417/44.1, 417/44.2, 413, 901, 413.1; 138/40, 46, 39, 138/44, 45; 96/6; 123/DIG. 12
See application file for complete search history.

(56) References Cited

U.S. PATENT DOCUMENTS

| | | | | |
|---|---|---|---|---|
| 4,278,402 A | * | 7/1981 | Nielsen | .................. 417/38 |
| 4,629,561 A | * | 12/1986 | Shirato et al. | ............ 210/198.2 |
| 5,466,229 A | * | 11/1995 | Elson et al. | .................. 604/317 |
| 5,624,394 A | * | 4/1997 | Barnitz et al. | .................. 604/67 |
| 5,901,750 A | * | 5/1999 | Kozinski | ..................... 138/45 |
| 6,248,157 B1 | * | 6/2001 | Sims et al. | ....................... 96/6 |
| 6,289,924 B1 | * | 9/2001 | Kozinski | ..................... 137/504 |
| 6,419,455 B1 | * | 7/2002 | Rousseau et al. | ............... 417/36 |
| 6,461,113 B1 | * | 10/2002 | Gaudet et al. | ................. 417/27 |
| 2003/0024489 A1 | * | 2/2003 | Balan et al. | ...................... 123/3 |

FOREIGN PATENT DOCUMENTS

| | | | |
|---|---|---|---|
| JP | 08-024509 | * | 1/1996 |
| JP | 8-024509 A1 | | 1/1996 |
| JP | 2000-102702 A1 | | 4/2000 |
| JP | 2000-162100 A1 | | 6/2000 |
| JP | 2001-087601 A1 | | 4/2001 |

\* cited by examiner

*Primary Examiner*—Devon C Kramer
*Assistant Examiner*—Leonard J Weinstein
(74) *Attorney, Agent, or Firm*—Darby & Darby P.C.

(57) ABSTRACT

A vacuum control system allows the degree of vacuum in a vacuum vessel to be kept constant while removing vaporized components degassed into the vacuum vessel through a gas permeation diaphragm by stably introducing a very small amount of air into a vacuum exhaust path of the vacuum vessel. The vacuum control system controls the rotary power of a DC brushless motor, continuously controls displacement of a vacuum pump, and thus keeps the degree of vacuum in a vacuum vessel constant, by decompressing the inside of the vacuum vessel using an exhaust vacuum pump which operates with the DC brushless motor, monitoring the inside pressure of the vacuum vessel using a pressure sensor, and controlling a voltage applied to the DC brushless motor on the basis of an output signal resulting from measurement of the inside pressure of the vacuum vessel by the pressure sensor.

1 Claim, 2 Drawing Sheets

VACUUM CONTROL SYSTEM

BACKGROUND OF THE INVENTION

1. Field of Invention

The present invention relates to a vacuum control system for keeping degree of vacuum accurate and constant in an instrument requiring vacuum (decompression), and specifically to a vacuum control system suitable for a vacuum degassing apparatus for removing dissolved gas from liquid isolated with a gas permeation diaphragm by reducing inside pressure of a vacuum vessel being fitted into a precision analytical instrument and having the gas permeation diaphragm by means of an exhaust vacuum pump, and a vacuum degassing apparatus employing the vacuum control system.

2. Description of the Related Art

Degassing apparatuses for removing or reducing dissolved gas in a liquid (hereinafter, this is referred to as "degassing") were conventionally widely used to secure stability or measurement accuracy of precision analytical instruments using a liquid. Since most of them have a basic structure that gas dissolved in a liquid is removed through the gas permeation diaphragm by allowing the liquid to flow in one side (for example, an inside of a degassing tube) isolated with the gas permeation diaphragm such as a degassing tube, which is provided in the vacuum vessel, having a property of transmitting a gas and not transmitting a liquid while decompressing the other side (for example, an inside of a vacuum vessel), they accompany a vacuum control system constituting a constant vacuum field.

In such type of conventional vacuum control system, in order to keep the inside pressure of a vacuum vessel constant, methods of monitoring the inside pressure of the vacuum vessel and intermittently activating a vacuum pump, or activating a switching valve provided in the vacuum exhaust path to adjust the vacuum condition, etc. are used.

On the other hand, in a vacuum degassing apparatus used for an analytical instrument, generally, a diaphragm type vacuum pump is widely used as the exhaust vacuum pump. If using the diaphragm type vacuum pump, since the vaporized components degassed into the vacuum vessel through the gas permeation diaphragm are compressed, condensed and generate dew condensation in a pump head to deteriorate the performance of the vacuum pump, various improvements have been contrived conventionally. For example, such improvements are disclosed in Japanese Unexamined Patent Application Publication No. 2001-87601, 2000-102702, Heisei 8-024509, 2000-162100 and the like.

SUMMARY OF THE INVENTION

In the vacuum degassing apparatus, when the processing target liquid and the throughput are not changed, the amount of gas dissolved after the degassing depends upon the degree of vacuum in the vacuum vessel. Therefore, it is preferable that the degree of vacuum in the vacuum vessel be kept as constant as possible from starting the degassing and to finishing the degassing. However, in the conventional vacuum control method, even if the vacuum pump is activated intermittently or the switching valve is activated, the degree of vacuum in the vacuum vessel including the gas permeation diaphragm repeatedly goes up and down with a constant width (range), so that it cannot be said exactly that the degree of vacuum is kept constant.

On the other hand, sensitivities of detectors used for precision analytical instruments such as rapid liquid chromatography requiring a liquid from which gas has been removed have been remarkably improved, and miniaturization or reduction in amount of the analytical instruments and systems has been further advanced. In this condition, when a liquid is degassed in a degassing apparatus of which the degree of vacuum is varied with some width as described above, variation in the amount of gas remaining in the liquid due to variation in the degree of vacuum makes a base line of an analytical instrument or detector instable. In addition, due to enhancement in performance of a gas permeation diaphragm with miniaturization of an analytical instrument and improvement in sensitivity of a detector, re-melting of vaporized components through the gas permeation diaphragm, which was not important conventionally, becomes important. However, from the viewpoint of cost, effects, and stability, the optimum solving means has not been provided yet.

Furthermore, during unattended operation with automation of analytical instruments, stable activation of the degassing apparatus, etc. is required, but in the conventional degassing apparatuses or vacuum control systems, an efficiency of suppressing or removing condensation of vaporized components degassed into the vacuum vessel through the gas permeation diaphragm in the vacuum exhaust path is low, and thus they are not practical. That is, in a method of introducing a very small amount of air into the vacuum exhaust path, which has been attempted conventionally, there are problems in that the introduction position is not proper, determination of resistance values of a resistance tube for introducing the small amount of air reproducibly is difficult, or variation of the resistance values is caused.

Accordingly, it is an object of the present invention to provide a vacuum control system capable of continuously adjusting the amount of exhaust of a vacuum pump by controlling the rotatory power of the vacuum pump motor, allowing the degree of vacuum in a vacuum vessel to be kept constant, effectively and accurately removing vaporized components degassed into the vacuum vessel through a gas permeation diaphragm by stably introducing a very small amount of air into a vacuum exhaust path, and thus operating stably, and a vacuum degassing apparatus employing the vacuum control system.

In order to accomplish the above object, according to a first aspect of the present invention, there is provided a vacuum control system for controlling the rotatory power of a DC brushless motor, continuously controlling displacement of a vacuum pump, and thus keeping the degree of vacuum in a vacuum vessel constant, by decompressing the inside of the vacuum vessel using an exhaust vacuum pump which operates with the DC brushless motor, monitoring the inside pressure of the vacuum vessel using a pressure sensor, and controlling a voltage applied to the DC brushless motor on the basis of an output signal resulting from measurement of the inside pressure of the vacuum vessel by the pressure sensor.

According to a second aspect of the present invention, in the vacuum control system according to the first aspect, air introduction means for continuously introducing a very small amount of air into a vacuum exhaust path is provided on the way of the vacuum exhaust path connecting the vacuum vessel to the exhaust vacuum pump.

At that time, it is preferable that a constant circulation resistance tube according to a third aspect of the present invention be used as the air introduction means (fourth aspect). In the third aspect, the constant circulation resistance tube is formed by coaxially inserting a resistance adjusting rod into a hollow capillary and can control a flow rate of gas circulating between the inner circumference of the hollow capillary and the outer circumference of the resistance adjusting rod by adjusting a circulation resistance of the gas, wherein the circulation resistance can be adjusted by varying an insertion length of the resistance adjusting rod inserted into the hollow capillary.

According to a fifth aspect, there is provided a vacuum degassing apparatus for removing dissolved gas from liquid isolated with a gas permeation diaphragm by reducing the inside pressure of a vacuum vessel including the gas permeation diaphragm with an exhaust vacuum pump, and the vacuum degassing system employs the vacuum control system according to any one of the first, second, and fourth aspect.

DESCRIPTION OF THE PREFERRED EMBODIMENT

Now, preferred embodiments of the present invention will be described in detail with reference to the accompanying drawings, but the present invention is not limited to the embodiments.

Figure 1:
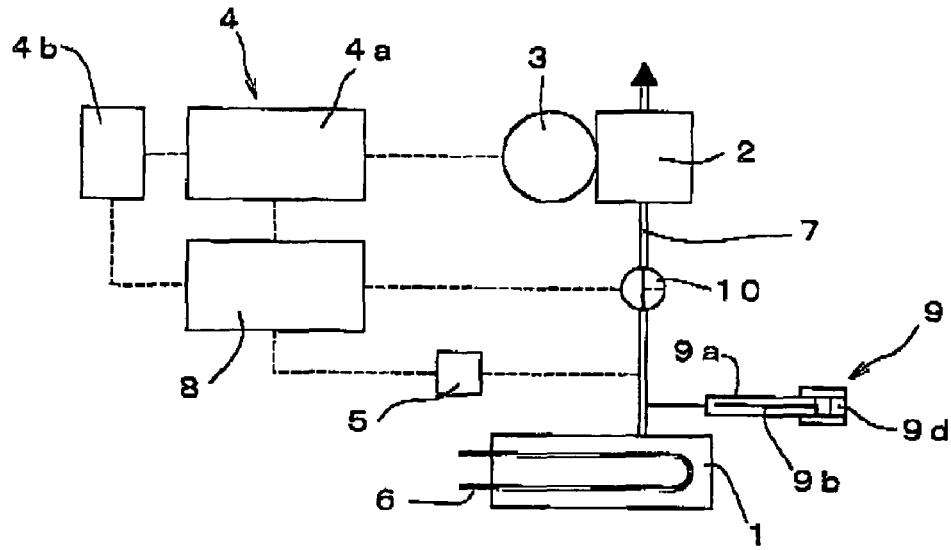
FIG. 1 is a system view illustrating an embodiment of a vacuum control system fitted into a vacuum degassing apparatus according to the present invention, where an example employing a single vacuum vessel is shown.
Figure 2:
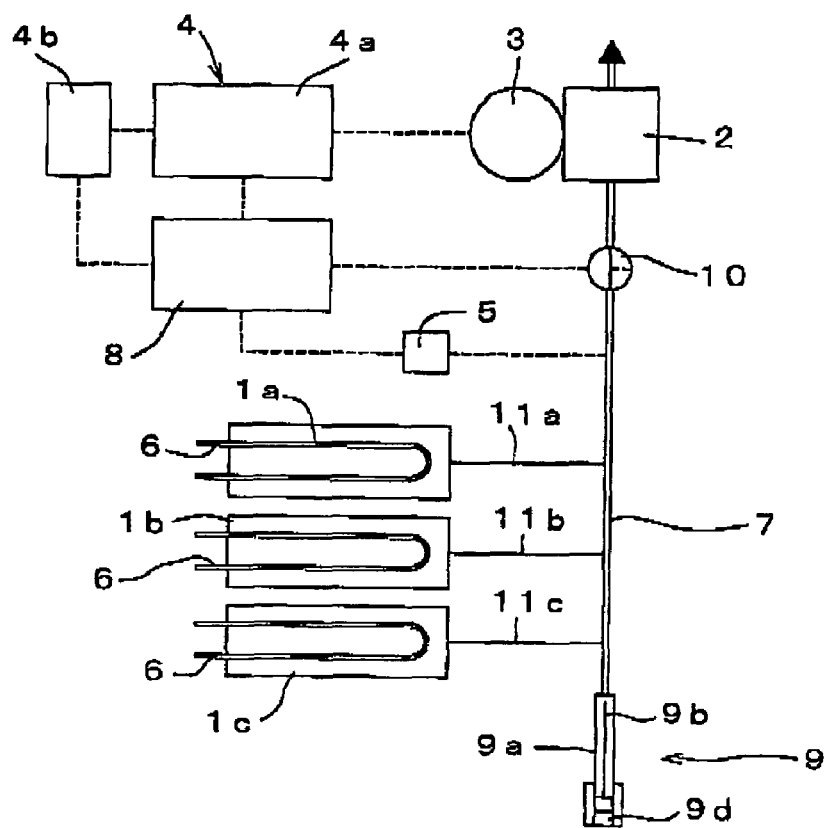
FIG. 2 is a system view illustrating another embodiment of the vacuum control system fitted into the vacuum degassing apparatus according to the present invention, where an example employing a plurality of vacuum vessels is shown.

A vacuum control system according to the present invention, as shown in FIGS. 1 and 2, basically comprises a vacuum vessel 1, an exhaust vacuum pump 2 for decompressing the inside of the vacuum vessel 1, a DC brushless motor 3 for driving the exhaust vacuum pump 2, a power source unit 4 for activating the DC brushless motor 3, and a pressure sensor 5 for monitoring and measuring the pressure (the degree of vacuum) in the vacuum vessel 1 and feeding back the measurement data (output signal) to the power source unit 4. By providing a gas permeation diaphragm 6 such as a degassing tube in the vacuum vessel 1 in the vacuum control system, the vacuum control system can be used as a vacuum degassing apparatus.

In addition, FIGS. 1 and 2 show embodiments of the vacuum control system fitted to a vacuum degassing apparatus, respectively. FIGS. 1 and 2 are different from each other in that a single vacuum vessel 1 is used in the former, but a plurality of vacuum vessels are used in the latter. In a case where a plurality of vacuum vessels 1 are used, three vacuum vessels 1a, 1b, 1c are shown in the drawing, but the number of vacuum vessels is not limited thereto.

In the following description, although the vacuum degassing apparatus in which the gas permeation diaphragms 6 are provided in the vacuum vessels 1 (1a, 1b, 1c) is exemplified as the best mode of the vacuum control system according to the present invention, the vacuum control system according to the present invention is not limited to the vacuum degassing apparatus, and it should be understood that the vacuum control system according to the present invention can also apply to a case where a solid or a liquid requiring a vacuum process is provided in the vacuum vessel 1 (1a, 1b, 1c).

In order to decompress the inside of the vacuum vessel 1, a vacuum exhaust path (pipe) 7 for allowing the vacuum vessel 1 and the exhaust vacuum pump 2 to communicate with each other is provided on the way with the pressure sensor 5 for always monitoring and measuring the inside pressure (the degree of vacuum) of the vacuum vessel 1 and converting the measured value into electrical signals to transfer the electrical signals to a control unit 8, and air introduction means 9 for continuously introducing a very small amount of air into the vacuum exhaust path. Furthermore, a flow path switching valve 10 represented by a three-way electromagnetic valve may be further provided as needed. At that time, the flow path switching valve 10 is provided closer to the exhaust vacuum pump 2 than the connection point of the air introduction means 9, and the air introduction means 9 is provided closer to the vacuum vessel 1 than the connection point of the pressure sensor 5.

For example, a diaphragm type vacuum pump is used as the exhaust vacuum pump 2, is driven by the DC brushless motor 3, and decompresses the inside of the vacuum vessel 1 communicating therewith through the vacuum exhaust path (pipe) 7 to keep a predetermined degree of vacuum.

The DC brushless motor 3 is used as a motor for driving the exhaust vacuum pump 2, and the rotatory power of the motor is controlled by controlling a voltage applied to the motor 3 to continuously control the amount of exhaust of the exhaust vacuum pump 2, whereby the degree of vacuum in the vacuum vessel 1 can be kept constant.

The power source voltage applied to the DC brushless motor 3 is supplied from the power source unit 4 on the basis of signals from the control unit 8 onto which a microcomputer is fitted. In addition, the power source unit 4 comprises a power source voltage adjusting section 4a for adjusting the power source voltage applied to the DC brushless motor 3 on the basis of the signals from the control unit 8, and a power source system section 4b.

A signal from the pressure sensor 5 for monitoring and measuring the inside pressure (the degree of vacuum) of the vacuum vessel 1 is input to the control unit 8 for controlling the power source voltage applied to the DC brushless motor 3. The control unit 8 compares the signal value obtained from the pressure sensor 5 with a predetermined value of vacuum degree, controls the power source adjusting section 4a of the power source unit 4 such that they always coincide with each other, and as a result, controls the power source voltage applied to the DC brushless motor 3, whereby the rotatory power of the DC brushless motor 3 is controlled and thus the exhaust speed is adjusted through variation of activation speed of the exhaust vacuum pump 2.

When the air introduction means 9 for introducing a very small amount of air into the vacuum exhaust path is fitted into this vacuum control system, a decrease in the degree of vacuum in the vacuum vessel 1 occurs due to the air always circulating through the air introduction means 9, in addition to the vaporized material in the vacuum vessel 1. Therefore, the exhaust vacuum pump 2 is always performing the exhaust activation with a flow rate corresponding to the variation in the degree of vacuum sensed by the pressure sensor 5. At that time, in the vacuum exhaust path (pipe) 7 in contact with the vacuum vessel 1 and the exhaust vacuum pump 2, the air always flows toward the vacuum pump regardless of whether the vaporized components from the vacuum vessel 1 exist, and as a result, the vaporized components from the vacuum vessel 1 are discharged externally without being condensed or staying in the vacuum exhaust path including inside the head of the vacuum pump 2.

In a case where the air introduction means 9 is directly connected to the vacuum vessel 1, since the introduced air may contaminate the inside of the vacuum vessel 1 as well as make it difficult to obtain a partial pressure equilibrium in the vacuum vessel 1, the degree of vacuum may become unstable, so that the case is not desirable. In a case where the air introduction means is connected to the head of the exhaust vacuum pump 2, since it is impossible to efficiently remove the condensed vaporized material in the vacuum exhaust path (pipe) 7 reaching the exhaust vacuum pump 2, the case is not desirable.

Figure 3:
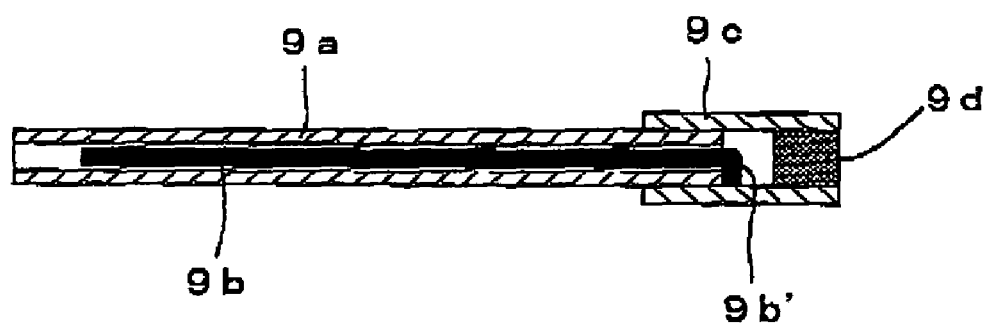
FIG. 3 is a schematic view illustrating an embodiment of air introduction means (constant circulation resistance tube) according to the present invention.

In this vacuum control system, it is preferable that the constant circulation resistance tube shown in FIG. 3 be used as the air introduction means 9.

This constant circulation resistance tube is formed by coaxially inserting a resistance adjusting rod 9$b$ having an outside diameter slightly smaller than the inside diameter of a hollow capillary 9$a$ into the hollow capillary 9$a$ having a small inside diameter, and can control the flow rate by allowing gas to flow between an inner circumference of the hollow capillary 9$a$ and an outer circumference of the resistance adjusting rod 9$b$ and adjusting a circulation resistance of the circulating gas. That is, the circulation resistance is determined on the basis of a difference between the inside diameter of the hollow capillary 9$a$ and the outside diameter of the resistance adjusting rod 9$b$ and an insertion length of the resistance adjusting rod 9$b$ into the hollow capillary 9$a$, and the circulation resistance is adjusted by varying the insertion length of the resistance adjusting rod 9$b$ into the hollow capillary 9$a$, so that the flow rate of the gas (air) circulating between the inner circumference of the hollow capillary 9$a$ and the outer circumference of the resistance adjusting rod 9$b$ can be adjusted.

In addition, in the constant circulation resistance tube shown in the drawing, the insertion length of the resistance adjusting rod 9$b$ into the hollow capillary 9$a$ is fixed by bending one end 9$b'$ of the resistance adjusting rod 9$b$ inserted into the hollow capillary 9$a$ to be locked on one opening edge of the hollow capillary 9$a$ and fitting a separation preventing short tube 9$c$ into an outer circumference of the one opening edge of the hollow capillary 9$a$, and a waste inflow preventing filter 9$d$ is fitted to an opening of the separation preventing short tube 9$c$. Therefore, with this constant circulation resistance tube, it is possible to easily introduce a very small amount of air into the vacuum exhaust path with a stable resistance value, and it is also possible to easily prevent generation of a disadvantage that wastes mixed with the air infiltrate the inside to vary the circulation resistance value.

In this regard, with a conventional needle valve used as a gas circulation resistance tube, it is difficult to set a small resistance value, and a mass flowmeter capable of measuring a small flow rate or converting the measurement result into electrical signals is expensive. When only a tube having a small inside diameter is used as the gas resistance tube, since variation in resistance value due to tolerance of the inside diameter should be adjusted only by using a tube length, it is difficult to prepare a resistance tube capable of easily obtain any small flow rate, and in addition, it is easily clogged due to the inflow of mixtures of wastes with the air. Such disadvantages that it is difficult to set an arbitrary resistance value and the resistance value is varied due to the clogging occur even when a filter having a small mesh is used at the introduction portion, and thus a method of preparing a circulation resistance tube through minute hole processing is not practical in reproducibility or cost.

The flow path switching valve 10 is used to remove condensations when the vaporized components generated in the vacuum vessel 1 is condensed in the head of the exhaust vacuum pump 2 in the vacuum degassing apparatus, is switched in response to deactivation of the vacuum pump 2 or in accordance with a predetermined time period, and has a function of allowing the air to pass through the head of the vacuum pump 2 for a short time.

In the vacuum control system according to the present invention, since the air introduction means (constant circulation resistance tube) 9 is provided in the vacuum exhaust path (pipe) 7 to introduce the small amount of air into the vacuum exhaust path, the vaporized components generated in the vacuum vessel 1 are continuously discharged without being condensed in the vacuum exhaust path (pipe) 7 or the head of the vacuum pump 2, and then the flow path switching valve 10 is not necessarily needed. However, when a diaphragm type vacuum pump is used as the exhaust vacuum pump 2, a compressing process is performed in the pump head in exhaust and thus the vaporized components can be compressed, condensed, and remain. As a result, it is preferable that the flow path switching valve 10 be provided.

In the vacuum control system according to the present invention, adjustment of the amount of exhaust of the exhaust vacuum pump 2 is usually performed continuously with variation of the degree of vacuum in the vacuum exhaust path, specifically, in the vacuum vessel 1. However, when the flow path switching valve 10 is activated in response to the signal from the control unit 8 in accordance with a predetermined time period, etc. to block the flow path from the vacuum vessel 1, a signal is sent to the power source voltage adjusting section 4$a$ of the power source unit 4, the exhaust vacuum pump 2 is activated up to the maximum discharge flow rate to clean the inside of the pump head with a large flow rate of air, and then the flow path switching valve 10 is restored in accordance with a predetermined time period, etc., to return to a usual control manner.

Next, the embodiment shown in FIG. 2 will be described.

This embodiment is different from the embodiment shown in FIG. 1 in that a plurality of vacuum vessels 1$a$, 1$b$, 1$c$ are used, but the constructions except for the above difference are basically similar. The plurality of vacuum vessels 1$a$, 1$b$, 1$c$ are connected in parallel to the vacuum exhaust path (pipe) 7 reaching the exhaust vacuum pump 2. In this case, the end of the vacuum exhaust path (pipe) 7 is provided with the air introduction means (constant circulation resistance tube) 9 to normally introduce the small amount of air into the vacuum exhaust path, and inside diameters of communication pipes 11$a$, 11$b$, 11$c$ for connecting the respective vacuum vessels 1$a$, 1$b$, 1$c$ to the vacuum exhaust path (pipe) 7 are set to be smaller than the inside diameter of the vacuum exhaust path (pipe) 7. As a result, since the vaporized components in the respective vacuum vessels 1$a$, 1$b$, 1$c$ do not infiltrate other vacuum vessels 1$a$, 1$b$, 1$c$ through natural diffusion, etc. the insides of the vacuum vessels are not contaminated. The vaporized components discharged from the respective vacuum vessels 1$a$, 1$b$, 1$c$ are mixed with the small amount of air flow introduced through the air introduction means (constant circulation resistance tube) 9, pass through the vacuum exhaust path (pipe) 7, and then are discharged from the exhaust vacuum pump 2. Therefore, it is possible to prevent mutual contamination in a degassing apparatus having a plurality of flow paths.

In the vacuum control system according to the first aspect of the present invention, since the rotatory power of the motor is controlled by monitoring the degree of vacuum in the vacuum vessel and converting the measurement result into the electrical signals to control the voltage to be applied to the DC brushless motor, the amount of exhaust of the exhaust vacuum pump can be controlled continuously. As a result, without keeping the degree of vacuum in the vacuum vessel while allowing the degree of vacuum to repeatedly go up and down with a constant width (range) as in a case where the vacuum pump is activated intermittently or the switching valve is activated, the degree of vacuum in the vacuum vessel can be kept constant substantially in a straight line shape. That is, even if a vaporized component which varies the degree of vacuum of the vacuum exhaust path is generated in the vacuum vessel, the variation in pressure is always fed back at the exhaust speed of the exhaust vacuum pump, so that the degree of vacuum in the vacuum vessel is continuously kept constant with a very small following delay corresponding to an extent of signal delay on an electric circuit.

In the vacuum control system according to the second aspect of the present invention, since the air introduction means for continuously introducing small amount of air into the vacuum exhaust path is provided on the way of the vacuum exhaust path connecting the vacuum vessel to the exhaust vacuum pump, it is possible to always activate the exhaust vacuum pump with a minute displacement, to prevent condensation of the vaporized components discharged from the vacuum vessel, and to accomplish enlargement of a life span and stabilization of the degree of vacuum of the whole vacuum exhaust path including the vacuum pump. In addition, even when a plurality of vacuum vessels are decompressed using only one vacuum pump, it is possible to prevent secondary mutual contamination in the vacuum vessels due to diffusion of the vaporized components.

Since the exhaust vacuum pump is always activated with a minute displacement and thus the DC brushless motor is controlled to be always rotated at a slow speed, intermittent stop and start of the DC brushless motor or the exhaust vacuum pump do not occur, so that there is an advantage in that a large load is not applied to the whole system.

In the constant circulation resistance tube according to the third aspect of the present invention, since the circulation resistance of the gas circulating between the inner circumference of the hollow capillary and the outer circumference of the resistance adjusting rod can be adjusted by varying the insertion length of the resistance adjusting rod inserted into the hollow capillary, the desired circulation resistance value can be obtained arbitrarily and easily, and the constant circulation resistance tube can be manufactured with low cost and can be used as the optimum air introduction means for introducing the small amount of air or another gas into the vacuum exhaust path in the vacuum control system, compared with a case of using the hollow capillary itself, forming fine holes in the hollow capillary or providing a filter as a resistor in the hollow capillary.

Furthermore, in the vacuum control system according to the fourth aspect of the present invention, since the aforementioned constant circulation resistance tube is used as the air introduction means on the way of the vacuum exhaust path connecting the vacuum vessel to the exhaust vacuum pump, the same advantages as the vacuum control system according to the second aspect can be obtained such as preventing condensation of the vaporized components discharged from the vacuum vessel and accomplishing elongation of a life span and stabilization of the degree of vacuum of the whole vacuum exhaust path including the vacuum pump.

In the vacuum degassing apparatus according to the fifth aspect of the present invention, the vacuum degassing apparatus for removing the dissolved gas from a liquid isolated with the gas permeation diaphragm by reducing the inside pressure of a vacuum vessel including the gas permeation diaphragm with the exhaust vacuum pump employs the vacuum control system according to any one of the first, second, and fourth aspect. As a result, the degree of vacuum in the vacuum vessel does not go up and down with an arbitrary width and the degree of vacuum in the vacuum vessel can be kept constant. Accordingly, the variation in the degassing level can be extremely reduced, and it is possible to perform the stable degassing without the secondary contamination.

Furthermore, when the vacuum degassing apparatus is fitted into a precision analytical instrument, it is possible to prevent the base line of a highly sensible detector from being instable due to variation in the degree of vacuum.

The vacuum control system according to the present invention employs a method of coping with continuous variation in the amount of exhaust, not a method of lengthen the activation time of the exhaust vacuum pump. As a result, the set degree of vacuum can be easily kept even when the degree of vacuum in the vacuum vessel is varied due to various external factors, the vacuum control system according to the present invention has an excellent responsibility to instantaneous variation in the degree of vacuum, and can be rapidly restored to the set degree of vacuum. Furthermore, since the exhaust speed is controlled with the degree of vacuum, one system can cope with vacuum vessels having different capacities only by setting the degree of vacuum.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed is:

1. A vacuum degassing apparatus for removing dissolved gas from liquid, comprising:
   a vacuum vessel including a gas permeation diaphragm;
   an exhaust vacuum pump; and
   a vacuum control system, the vacuum control system including:
      a controller for monitoring the inside pressure of the vacuum vessel using a pressure sensor, and controlling a voltage applied to a DC brushless motor on the basis of an output signal resulting from measurement of the inside pressure of the vacuum vessel by the pressure sensor to control the displacement of the exhaust vacuum pump; and
      an air introduction device inserted in a vacuum exhaust path connecting the vacuum vessel to the exhaust vacuum pump for continuously introducing a controlled amount of air externally supplied into the vacuum exhaust path, the air introduction device comprising a constant circulation resistance tube which is formed by coaxially inserting a resistance adjusting rod into a hollow capillary and which can control a flow rate of gas circulating between an inner circumference of the hollow capillary and an outer circumference of the resistance adjusting rod by adjusting a circulation resistance of the gas,
   wherein gas dissolved in the liquid is isolated with the gas permeation diaphragm by reducing the inside pressure of the vacuum vessel by operating the exhaust vacuum pump, and by operating the controller to hold the degree of vacuum in the vacuum vessel constant, and
   wherein the circulation resistance of the externally-supplied air can be adjusted by varying an insertion length of the resistance adjusting rod inserted into the hollow capillary and can be fixed by fitting a separation preventing short tube to an outer circumference of the hollow capillary at an opening end.

* * * * *